UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT FLOWABLE PYROXYLIN COMPOSITION.

SPECIFICATION forming part of Letters Patent No. 630,945, dated August 15, 1899.

Application filed January 19, 1899. Serial No. 702,636. (No specimens.)

*To all whom it may concern:*

Be it known that I, JOHN H. STEVENS, of the city of Newark, county of Essex, and State of New Jersey, have invented certain new and useful Improvements in Transparent Flowable Pyroxylin Compositions of Matter, of which improvements the following is a specification.

Pyroxylin or nitrocellulose is formed by subjecting cotton, paper, or other cellulose fiber to the action of nitric and sulfuric acids. It is a substance which presents many varieties or kinds, dependent on the reaction between the cellulose and nitrous elements of the acid-bath.

The classification of pyroxylin has been based on the amount of nitrogen or nitro elements present, but also and chiefly on its solubility in different menstrua known as "solvents of pyroxylin."

In making flowable pyroxylin solutions for use in the arts as varnishes, lacquers, and for waterproofing purposes the classification based on solubility is generally the only one kept in view. Hence the compositions to which my invention pertains demand a pyroxylin which is soluble in the ordinary liquid menstrua—such as wood-spirit, acetone, methyl acetate, amyl acetate, alcohol ether, &c.—all of which are well known and used for these purposes.

The strictly chemical classification of pyroxylin is useful for explosives, and the varying solubility of pyroxylins having the same chemical composition is of less importance in making explosives than the amount of nitrogen present, because it is the amount of nitrogen gas liberated on explosion which determines the usefulness of the pyroxylin employed for such purpose.

Pyroxylin compounds can be divided into many classes. One of the important classes, however, is that of collodions or flowable solutions, which are made by simply dissolving ordinary soluble pyroxylin in sufficient solvent to form the proper consistency.

While many pyroxylin compounds are of a non-transparent nature, there are certain purposes for which high transparency is desired, especially in the final film deposited after the solvents have been evaporated.

Pyroxylin and its compounds are more or less liable to a decomposition which results in the generation of free acid. This is hindered by the presence of solvents or the dissolved condition; but unless a preservative substance is present there is always danger of the evolution of acid, which is detrimental, and especially to the final film deposited on drying, because a film of an acid nature will attack metals, lose its luster, and be otherwise damaged. While this decomposition is more liable to affect solid pyroxylin compounds, and especially those which are subjected to heat, nevertheless it is a detriment to the liquid compounds, although this has not been generally recognized.

I have traced many of the imperfections in liquid compounds to the decomposed condition and corrosive action of the unprotected pyroxylin. I have observed even highly-fluid solutions turned so acid that they would strongly corrode metals dipped into them, and I have found that much of the discoloration often observed in films made from evaporated solutions is due to the partly-decomposed pyroxylin.

While there are plenty of known means of securing stability in non-transparent pyroxylin solutions and plenty of substances which will dissolve in pyroxylin solvents and form a transparent mixture so long as the solvent is present, there are very few substances known which will dry transparent in the final film and at the same time act as preserving agents, so as to keep the film in a permanent neutral condition without causing discoloration, lack of surface brilliancy, or other defects. Hence any composition of matter which has the desired properties depends on study and experiment, especially with proportions, the properties of substances, and their behavior during the evaporation of the solvents and final solidifying of the residues.

While, as before stated, little attention has been given to the stability of these flowable preparations, the difficulty in obtaining suitable antacid or preserving agents for explosives and also solid manufacturing pyroxylin compounds has shown that successful antacid agents must necessarily be selected from a large number of substances which might be expected to yield good results, but which fail in the trial.

Experience has shown that some substances, while known as neutralizers of acid, injure nitrocellulose compounds by aiding or inviting decomposition, and some cause discoloration, and most of them are incompatible with transparency.

The present invention is based on the peculiar properties residing in certain solid bodies which are non-solvents of the pyroxylin commonly employed in making flowable solutions, and its distinctive novelty depends on my discovery that the important properties of transparency and chemical permanency, especially in the dried film or final product, are indispensably associated with the proportions of these bodies used. As a further proof of the novel use I make of these new bodies I can state that while one of them has been suggested to be used in connection in a limited way with a certain kind of pyroxylin, known as "tetranitrocellulose" and in larger proportions than would be useful in my compounds it has been so suggested as an equivalent for a number of other bodies which are totally unfit for my purposes in any proportion, for these bodies would fail to give chemical stability and many of them would be detrimental in other respects. For instance, they would act on the film in such a way as to destroy its luster.

The group of bodies to which I refer and which are included within my invention are known as the "zinc salts of the volatile monatomic fatty acids." The principal acids of this group are formic, acetic, propionic, butyric, and valeric acids, and I confine my invention to the zinc salts of these acids. The salts resulting from the chemical combination of these acids with zinc are zinc formate, zinc acetate, zinc propionate, zinc butyrate, and zinc valerate. These are the salts which form one part of my new flowable transparent composition of matter. I have used these salts successfully and have determined by experiment their relative value for the purpose. While they all possess more or less antacid power, I prefer to use the salts which are most easily soluble, especially in wood-spirit. By "soluble" of course I mean (as is usually meant by the term) in the cold. I have found that acetate of zinc gives every effect required and has the advantage of cheapness. A good proportion when using any of these zinc salts is one per cent. to the weight of the pyroxylin present in the mixture. More (up to five per cent.) or less can be used; but the operator must bear in mind that a less amount will give decreased stability, although I find that in these compounds one-half of one per cent. gives very fair results. As to larger proportions, they will tend to cloud or weaken the compounds, especially in the residues after evaporation, unless they are employed in moderation. When five per cent. is exceeded, the solutions make clouded or discolored effects or result in other undesirable properties.

The manufacture of flowable pyroxylin solutions is well understood by operators in this art. The particular solvent employed and the fluidity or stiffness of the solutions are questions of judgment, based on what is well known of the properties of the ingredients and application of the mixtures. Some of the most important compounds are in the form of a paste.

By "flowable" solutions I mean such solutions as can be flowed or spread, as distinguished from solutions which are too stiff to be worked in the cold. The non-flowable solutions are solid pyroxylin compounds, which generally are manipulated in rolls or equivalent mixing machinery and formed into shape afterward by being pressed into masses or blocks, which, if desired, can be cut into sheeting. These compounds are also forced through nozzles into such forms as tubes, rods, and strips.

While I am unable to explain why a basic substance already saturated with an acid can act as a preserving agent and prevent the deleterious action of the corrosive nitro compounds in decomposing pyroxylin, my experiments have nevertheless demonstrated this to be a fact. I can only state that it seems to depend on the nature of the acid radical present in the preserving agent. Even when the elements contained in these preserving salts are united to other substances—for instance, in neutral salts containing dissimilar acid radicals—the resultant compound salt possesses preserving power at least in proportion approximating to the amount of such element present. Chloracetate of zinc is an example of such compound salt. As an instance of the effect of the nature of the acid radical present in these preserving salts I can state that I have found by experiment that while zinc acetate is a good antacid substance in connection with pyroxylin, sulfite of zinc and chlorid of zinc are totally unsuitable as ingredients in my compounds. Perfect solubility of the salt in the solvent employed and the ability to form highly-transparent effects do not give the salt antacid power, for I have found that chlorid of zinc dissolves in wood-spirit and grain-alcohol and forms a highly-transparent combination with the pyroxylin compounds, while at the same time it is useless for antacid purposes in my compounds. Besides lacking the necessary preserving power I find that compounds made with deliquescent chlorids attract moisture, and hence articles coated with a pyroxylin compound containing the chlorids of zinc or calcium become wet on the surface, which attracts dust and detracts from the necessary luster. While the chlorid salt can be washed away from the surface, it is always liable to exude from the body of the material and form fresh deposits.

I am aware that one of the members of my new group of antacid substances—namely, acetate of zinc—has been proposed as a solvent of a certain kind of pyroxylin known as "tetranitrocellulose" in connection with alcohol and methylated spirit and as a substitute and equivalent for calcium chlorid and zinc chlorid, the proportion to be used being about five per cent. to the amount of alcohol employed. It necessarily requires such excessive proportions of solvent for flowable solutions that the suggested proportions of zinc acetate are very much larger than the proportions I have found to be useful. While a solution of tetranitrocellulose in alcohol containing about five per cent. of the zinc acetate to the alcohol would doubtless present a transparent appearance, any attempt to evaporate the solution would result in a non-transparent film, besides which it is by no means certain that zinc acetate has been suggested for use in flowable solutions of even the particular kind of pyroxylin known as "tetranitrocellulose," because such suggestion has always been coupled with instructions to select such from among the numerous solvents mentioned as would be best fitted for the special purpose in view. As the other substances mentioned include strong solvent esters, it is not certain that zinc acetate has been suggested to be used in flowable solutions. The fact that none of the various kinds of pyroxylin commonly used in making flowable solutions are soluble in an alcoholic solution of zinc acetate has some bearing on this point.

Acetate of zinc will not aid alcohol (either ethylic or methylic) in dissolving the ordinary kind of pyroxylin used for flowable compositions; but my experiments have positively demonstrated that it retards or weakens the solvent power directly as to the amount present in the alcohols. For instance, a five-per-cent. solution in ninety-five-per-cent. ethylic alcohol will not dissolve the ordinary pyroxylin when the alcohol is even in large excess and at the end of two days' contact at ordinary atmospheric temperatures. By using a methylic alcohol so weak with water that it barely dissolves pyroxylin I find that a saturated solution of zinc acetate in this weak alcohol is an absolute non-solvent. Besides this my experiments have demonstrated that all proportions in which zinc acetate has been recommended to be used would fail to give a final transparency. I believe, therefore, that I am the first to discover and apply the proper proportions of zinc acetate for manufacturing a flowable transparent pyroxylin compound which will remain transparent when evaporated to a dry residue or film.

While I include in my invention the zinc salts of the volatile monatomic fatty acids as preserving agents for flowable transparent pyroxylin solutions, whether the salts are simple, compound, mixed, or combined chemically with other salts or compounds, I exclude any combination of the salts of this specification with the halogen acids, for such compounds have already been secured to me in United States Patent No. 614,514, of November 22, 1898, which patent includes such substances, for instance, as chloracetate of zinc, chlorpropionate of zinc, chlorbutyrate of zinc, &c.

In the United States Letters Patent granted to me April 4, 1899, No. 622,294, I have described and claimed the use of the zinc salts of the volatile monatomic fatty acids herein referred to when used in pyroxylin compounds containing camphor as an ingredient; but my present invention is based on the discovery that the zinc salts of the volatile monatomic fatty acids herein referred to and described are useful as a preservative of pyroxylin compounds which do not contain camphor when used as herein described and set forth.

Having thus fully described my invention, what I claim, and desire to secure by Letters Patent, is—

1. A flowable, transparent composition of matter consisting of pyroxylin, a solvent of the same, and a zinc salt of the group consisting of formate of zinc, acetate of zinc, propionate of zinc, butyrate of zinc, and valerate of zinc, the said salt being present in proportion not exceeding five per cent. of the amount of pyroxylin, substantially as described.

2. A flowable transparent composition of matter containing pyroxylin, a solvent of the same, and acetate of zinc, in proportions not exceeding five per cent. of the pyroxylin, substantially as described.

JOHN H. STEVENS.

Witnesses:
WALTER P. LINDSLEY,
M. R. EISELE.